United States Patent [19]
Cain

[11] 3,767,229
[45] Oct. 23, 1973

[54] INFLATABLE DASH-PANEL CONSTRUCTION

[76] Inventor: Robert H. Cain, 510 Garner Rd., Milford, Mich. 48042

[22] Filed: Dec. 30, 1971

[21] Appl. No.: 214,220

[52] U.S. Cl............ 280/150 AB, 180/90, 280/150 B
[51] Int. Cl. ............................................. B60r 21/08
[58] Field of Search................ 280/150 AB, 150 B; 180/90

[56] References Cited
UNITED STATES PATENTS

| | | | |
|---|---|---|---|
| 3,450,414 | 6/1969 | Kobori.......................... | 280/150 AB |
| 2,755,125 | 7/1956 | Hodges......................... | 280/150 AB |
| 3,425,712 | 2/1969 | Berryman...................... | 280/150 AB |
| 3,624,810 | 11/1971 | Hass............................. | 280/150 AB |
| 3,473,824 | 10/1969 | Carey et al.................... | 280/150 AB |
| 3,630,472 | 12/1971 | Axenborg...................... | 280/150 AB |
| 3,614,128 | 10/1971 | Sobkow......................... | 280/150 AB |
| 2,626,163 | 1/1953 | Scantlebury.................. | 180/90 X |
| 2,822,187 | 2/1958 | Bibbs............................. | 280/150 B |
| 2,854,281 | 9/1958 | Cassin........................... | 280/150 B |

Primary Examiner—Kenneth H. Betts
Assistant Examiner—John P. Silverstrim
Attorney—Robert A. Sloman

[57] ABSTRACT

An inflatable dash-panel construction adapted to be mounted on a conventional automobile dash-panel and occupy a non-obstructing position when deflated, but which will respond to emergency conditions to be inflated and form a monoplanar screen between the occupants and the dash-panel without, however, pinning the occupants in place, to protect them against collision with the dash-panel windshield group.

3 Claims, 4 Drawing Figures

PATENTED OCT 23 1973 3,767,229

INFLATABLE DASH-PANEL CONSTRUCTION

GENERAL DESCRIPTION

This application relates to inflatable and deflatable dash-panel constructions which may be incorporated as original equipment as part of an automobile dash-panel, but which may also and preferably be formed as an attachment to be attached to a conventional already built dash-panel.

In either form the device is deflatable and inflatable. When deflated it occupies an unobstrusive position on the dash without materially obstructing the vision of the occupants. On emergency conditions, as in a collision, the device is inflated automatically to form a monoplanar screen between the windshield - dash-panel grouping and the occupants, without, however, projecting to the occupants or to the steering wheel, and thus without interfering with the occupant's position or capacity to continue operating the vehicle and without pinning the occupants in their seats.

THE DRAWINGS

A preferred embodiment is shown in the appended, schematic drawings. In these drawings.

DETAILED DESCRIPTION

Figure 1:
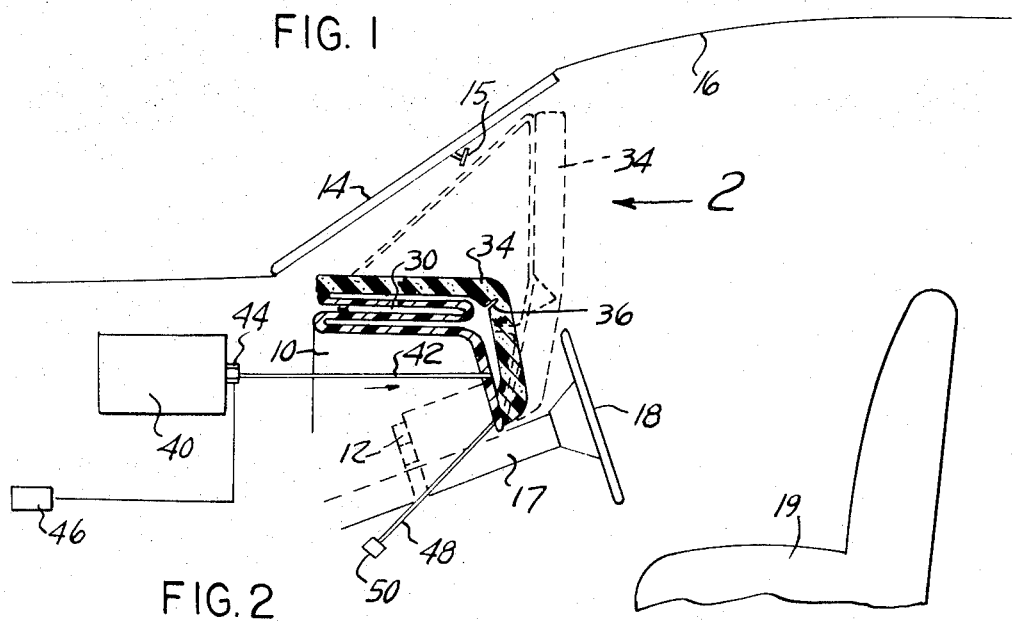
FIG. 1 is a schematic view of a part of an automobile and the improved inflatable dash-panel construction of this application with the device shown in full lines in deflated position and in dotted lines in inflated position.

The drawing shows schematically a conventional automobile construction including a dash 10 beneath which is an instrument panel 12 and above which is a windshield 14, a mirror 15, and a header 16; and further shows a steering column 17, a steering wheel 18, and a front seat 19. These parts shown schematically assist in orienting the device itself now to be described.

Figure 3:
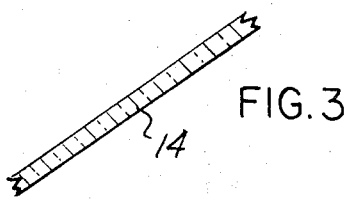
FIGS. 3 and 4 are views of the device per se in deflated and inflated conditions respectively.
Figure 4:
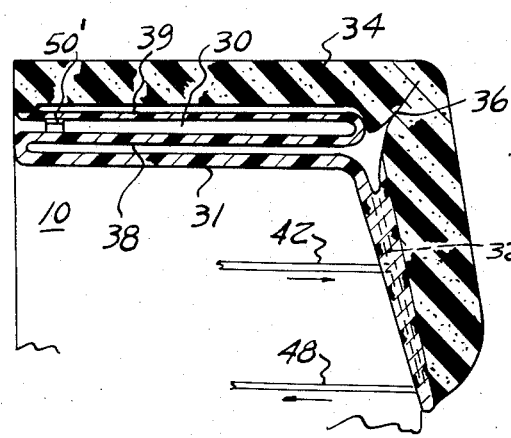
Figure 4:
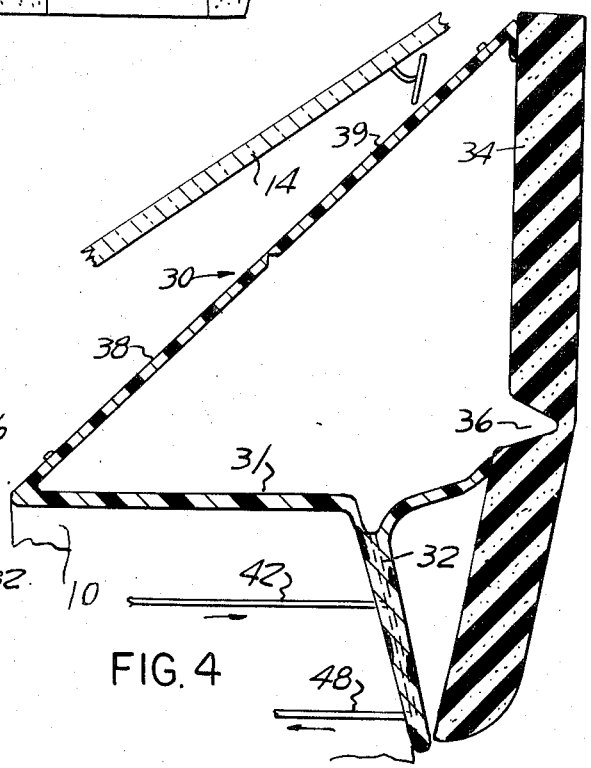

The device itself comprises an inflatable bag 30 having a cover part 31 and a skirt part 32, and which is secured to the dashboard 10, FIGS. 3 and 4.

Loosely overlying the cover part and skirt is a padding 34 of cushioning material of L-shape with a fold or crease 36.

Flexible reverse folded webbing 38,39 interconnects the forward ends of cover part 31 and padding 34 to complete the deflated bag 30, FIGS. 1 and 3.

The inflation means also shown diagramatically includes an air pressure reservoir 40 connected by a conduit 42 to the bag and controlled by a valve 44 which opens in response to impact upon an impact sensor 46. Bag 30 is also equipped for deflation through a conduit 48 controlled by a release valve 50.

OPERATION

With bag 30 and its cushioning material 34 in place as shown in FIGS. 1 and 3, an emergency or collision impact on sensor 46 will open valve 44 and cause bag 30 to inflate to the dotted line position shown in FIG. 1 and as shown in FIG. 4 so that the device 30–34 will form a monoplanar screen between the grouping of dash 10 - panel 12 - windshield 14 - mirror 15 - header 16 and the steering wheel 18 and the driver or passenger on the front seat 19 of the vehicle.

The inflated device can be deflated by opening of the valve 50. This can be done automatically if desired, after a brief time interval of any desired length, or manually as desired. When the device is deflated it can then be folded back and secured in place and ready for another use, FIG. 3.

It is important to note that while the device shields the occupants from collision with the grouping of dash - panel - windshield - mirror - header, it does not pin the occupants in place nor interfere with the capacity of the driver to operate the vehicle.

FURTHER DISCUSSION

The device may be formed of any suitable material or finish and styling to become an appropriate part of the decor of the vehicle.

Figure 2:
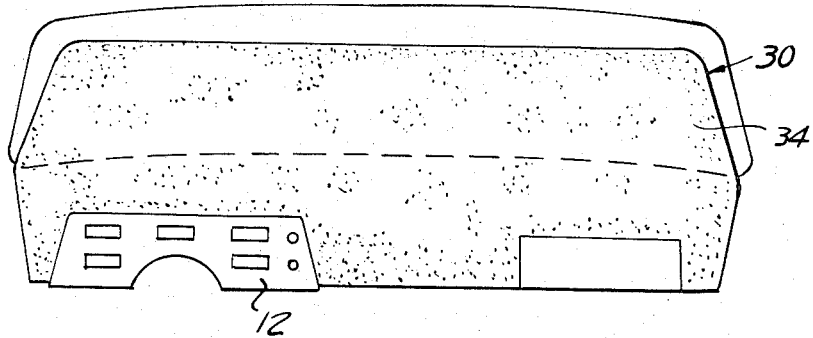
FIG. 2 is a view as if in the direction of the arrow 2 of FIG. 1.

The depending skirt 32 of the device will of course be formed with suitable cut outs, FIG. 2, to expose the usual instrument cluster as well as the glove compartment as well as other control features of the vehicle mounted on the panel. These cut outs, however, are of such size and shape as not to deprive the depending padding 34 of the device from its protective characteristic, namely, that it is inflatable and is formed with a cushion or padding, and is positioned forward of but near the panel 12.

The device is formed really as a cover over the horizontal dash and thus eliminates the need for special compartments and compartment covers as well as providing for greater freedom and flexibility in design, styling and construction of the vehicle and likewise provides for ample room for the controls found on a panel, namely, such things as defrosters, ventilators, radio controls, and so forth conventionally found in vehicles.

The device is shown as equipped with deflating means and therefore is available for reuse whenever desired.

In the event of a collision, the occupants of the vehicle will be thrown against the screen formed by the inflated bag and its cushioning material and thus protected from being thrown violently against the dash, panel, mirror, windshield, header, and the like normally found in vehicles. When the device is inflated, as on emergency conditions, the device will completely cover the windshield, mirrors, dash-panel and so forth to provide a stop in the form of a stationary pneumatic screen with its cushioning material to inhibit forward motion of the occupants without, however, pinning the occupants in any awkward or dangerous positions.

With appropriate time delay valves, particularly in the deflating line 48, deflation may be deferred for as long as desired and under the control of the valves that are provided and designed for the device.

Inasmuch as the valves and air pressure and deflating devices are well within the skill of those skilled in the art, and specifically and per se form no part of the present invention, the details of such devices are not herein disclosed.

Further, the fastening means 50 for the collapsed folds 38,39 may be snap fasteners, or other forms of fasteners.

In operation, the L-shaped inflatable cover assembly fits snugly down and upon the vehicle dashboard and its bottom or base portion 31 anchored to the dash and with forward portion of the skirt 32 likewise anchored to the dash.

The reverse folded elements 38,39 lie loosely over the base 31. The spacing there in FIG. 3 is exaggerated merely for illustration. Likewise, the spacing between the upper fold element 39 and the undersurface of the padding 34. Normally speaking, this would all be compact down reasonably snug upon the dashboard to provide a padded dashboard assembly 34 of L-shape as shown in FIG. 3.

Immediately upon impact, however, compressed air inflates the bag 30 as shown in FIG. 4 with the reverse folded elements 38,39 becoming coplanar and in alignment and with the padding 34 in substantially upright position with its elements coplanar.

Now having described the device herein disclosed, reference should be had to the claims which follow.

I claim:

1. Inflatable means for a vehicle dash-panel construction comprising a hollow inflatable bag, said bag including a cover part overlying and secured to said dash;
   a laterally elongated skirt depending from the rear of said cover part secured to said dash and positioned rearward of the instrument panel below the dash;
   a resilient padding normally folded into L-shape to loosely overlie said cover part and skirt;
   a lower portion of said padding being secured to said skirt;
   and a reverse folded webbing element normally overlying said cover part with one end connected to a forward portion of the cover part and with its other end connected to the forward end of said padding;
   said cover part, said webbing and a portion of said padding normally lying on the dash below the windshield;
   means controlled by emergency impact only for inflating the bag to expand and unfold said webbing element to a planar position and said padding to a substantially upright position between the dash panel windshield grouping and the occupants of the vehicle;
   said padding forming a substantially monoplanar screen reaching from the vehicle header to the panel below the dash;
   and releasable fastening means interconnecting the outer forward ends of said reverse folded webbing.

2. Inflatable means for a vehicle dash-panel construction comprising a hollow inflatable bag, said bag including a cover part overlying and secured to said dash;
   a laterally elongated skirt depending from the rear of said cover part secured to said dash and positioned rearward of the instrument panel below the dash;
   a resilient padding normally folded into L-shape to loosely overlie said cover part and skirt;
   a lower portion of said padding being secured to said skirt;
   and a reverse folded webbing element normally overlying said cover part with one end connected to a forward portion of the cover part and with its other end connected to the forward end of said padding;
   said cover part, said webbing and a portion of said padding normally lying on the dash below the windshield;
   means controlled by emergency impact only for inflating the bag to expand and unfold said webbing element to a planar position and said padding to a substantially upright position between the dash panel windshield grouping and the occupants of the vehicle;
   said padding forming a substantially monoplanar screen reaching from the vehicle header to the panel below the dash;
   a tubular deflating line at one end extending into said bag;
   and a pressure release valve on the other end of said deflating line, whereby on actuating of said valve, the parts of said bag will collapse to its original position.

3. Inflatable means for a vehicle dash-panel construction comprising a hollow inflatable bag, said bag including a cover part overlying and secured to said dash;
   a laterally elongated skirt depending from the rear of said cover part secured to said dash and positioned rearward of the instrument panel below the dash;
   a resilient padding normally folded into L-shape to loosely overlie said cover part and skirt;
   a lower portion of said padding being secured to said skirt;
   and a reverse folded webbing element normally overlying said cover part with one end connected to a forward portion of the cover part and with its other end connected to the forward end of said padding;
   said cover part, said webbing and a portion of said padding normally lying on the dash below the windshield;
   means controlled by emergency impact only for inflating the bag to expand and unfold said webbing element to a planar position and said padding to a substantially upright position between the dash panel windshield grouping and the occupants of the vehicle;
   said padding forming a substantially monoplanar screen reaching from the vehicle header to the panel below the dash.

* * * * *